United States Patent
Rogers

[15] 3,685,469
[45] Aug. 22, 1972

[54] COMBINATION SOIL CONDITIONER AND SEEDER

[72] Inventor: Chester D. Rogers, Olathe, Kans.

[73] Assignee: Jacobsen Manufacturing Company, Racine, Wis.

[22] Filed: July 6, 1970

[21] Appl. No.: 52,454

[52] U.S. Cl. ............... 111/87, 172/42, 172/119, 172/150, 172/68
[51] Int. Cl. ........................ A01c 5/06, A01b 33/02
[58] Field of Search .... 111/87, 85, 86, 88, 7; 172/42, 172/72, 48, 63, 71, 72, 118, 119, 123

[56] References Cited

UNITED STATES PATENTS

| | | | |
|---|---|---|---|
| 3,507,233 | 4/1970 | Greig | 111/85 |
| 3,367,293 | 2/1968 | Cox | 111/85 |
| 3,200,778 | 8/1965 | Whelchel | 111/85 |
| 3,160,123 | 12/1964 | Roquemore | 172/42 X |
| 3,420,314 | 1/1969 | Hastings | 172/42 |
| 2,864,294 | 12/1958 | Pearsons, Jr. | 172/42 |
| 2,691,353 | 10/1954 | Secondo | 111/85 X |

Primary Examiner—Robert E. Pulfrey
Assistant Examiner—Stephen C. Pellegrino
Attorney—Schmidt, Johnson, Hovey & Williams

[57] ABSTRACT

A combination tillage and planting implement utilizes a bank of rotatable cutters for slashing a plurality of trenches into sod, or other mat-like ground cover, and a bank of rotatable discs in alignment with the cutters which roll along the bottoms of the trenches for maintaining the latter open while such material as seed or fertilizer is fed thereto, for directing the material into the trenches and for pressing the material into the trenches.

1 Claim, 6 Drawing Figures

PATENTED AUG 22 1972 3,685,469

INVENTOR.
Chester D. Rogers
BY Schmidt, Johnson, Hovey
Williams & Chase
ATTORNEYS.

INVENTOR.
Chester D. Rogers
BY Schmidt, Johnson, Hovey
Williams & Chase
ATTORNEYS.

COMBINATION SOIL CONDITIONER AND SEEDER

This invention relates to an implement particularly suited for seeding or fertilizing sodded ground such as lawns and pastures while simultaneously aerating and scarifying the soil.

Maintaining a desirable stand of grass and other sod or turf-like herbage has long been an extremely difficult problem for farmers, homeowners, businesses, industry and those responsible for maintaining recreation areas. Periodic seeding, fertilizing and watering is expensive and, in general, does not produce a vigorous stand. It is generally agreed that the problem lies in inability to sufficiently cultivate the soil to promote growth. Seeding is normally accomplished by broadcasting the seed on the surface with little or no prior conditioning of the turf. The fact that the seed lies exposed and uncovered requires constant watering until germination occurs and then very frequent watering until the roots of the plant have gained a sufficient hold on the soil. Germination under such conditions frequently does not exceed 10 percent of the total seed planted. Even the seed which takes root does not produce a particularly hardy stand because of the nearness of the roots to the surface.

The present invention overcomes such problems by cutting trenches through the sod and turf into the ground, and then depositing the seed into the trenches. The natural tendency of the trenches to collapse usually presents sufficient loose soil to cover the seed resulting in nearly 100 percent germination, but a drag behind the machine may be used to sweep soil removed by the cutters back into the trenches. Minimal watering is required and the resulting stand is considerably more hardy because of the depth of the root network.

It is, therefore, an object of the invention to provide a combination tillage and plating implement having a bank of rotatable cutters which aerate and scarify the soil while providing a trench in which seed or fertilizer is placed.

A further object of the invention is a combination tillage and planting implement which is useful in achieving nearly complete germination of seed because the see is placed in a trench that is cut through the sod and into the soil rather than being scattered on top of the plant growth.

Another object of the invention is to achieve tillage of the soil simultaneously with the planting of seed by utilizing a combination tillage and planting implement thereby conditioning the soil to retain air and moisture while eliminating seed loss caused by surface erosion and lack of germination because of improper temperature-moisture conditions within the soil as needed for such purpose.

Figure 1:
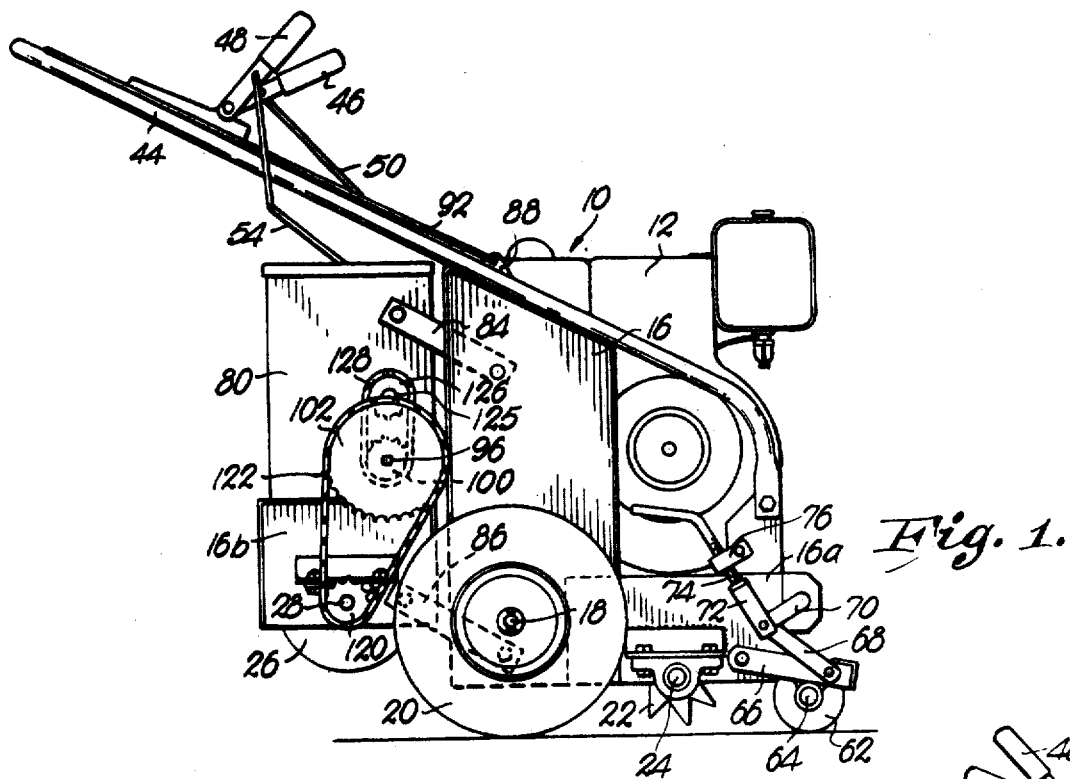
FIG. 1 is an elevational view showing one side of a combination tillage and planting implement constructed according to the present invention.

While the principles of the present invention are illustrated by the drawings in the form of a relatively small, self-propelled lawn machine, it is to be understood that I also contemplate the same process in a farm implement type of machine. Seeds larger than most grasses, such as oats, may be similarly planted in pastures, for example. Maintenance of hay and grazing lands by aeration, fertilization, reseeding and the like has not been generally or widely practiced because of the lack of proper equipment. Yet, there is a great need and a growing desire for better farming methods with regard to sod-like crops and my present invention is also directed to such improved end results.

A vehicle 10 powered by an engine 12 has supporting framework 16 carried by an axle 18 which is provided with ground wheels 20 rigid thereto. Each of a plurality of cutters 22, of a bank of the same, is rigidly secured to a shaft 24 rotatably supported by a lower front extension 16a of the frame 16. Each of a plurality of a follower means in the nature of rotatable discs 26, of a bank of the same, is rigidly secured to a shaft 28 which is rotatably supported by a rear extension 16b of the frame 16.

Figure 2:
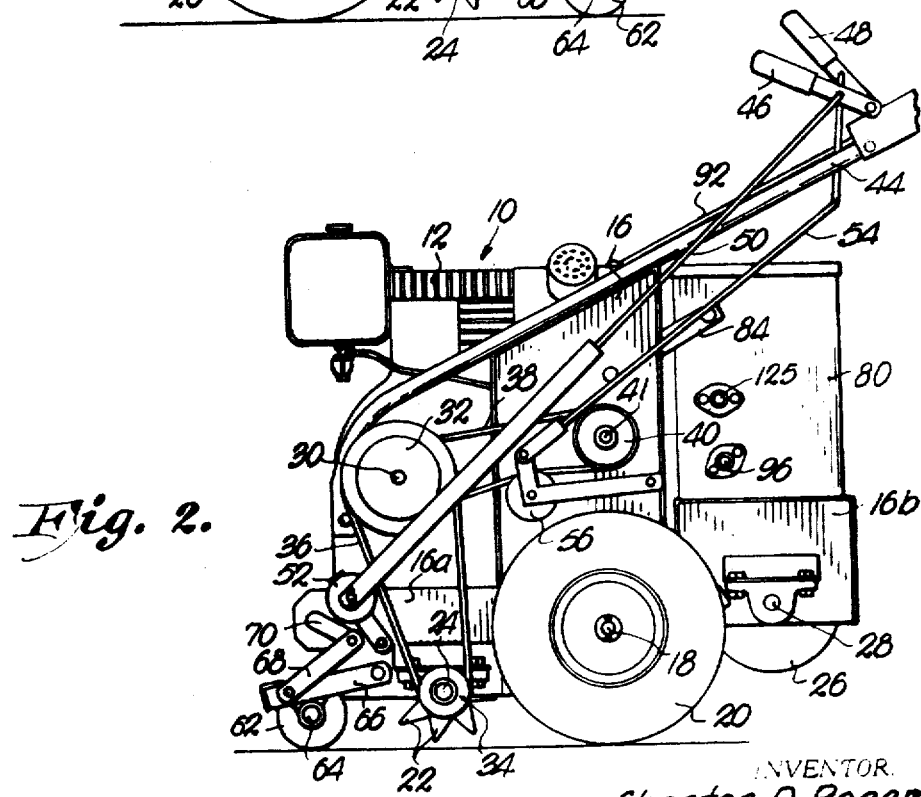
FIG. 2 is an elevational view showing the opposite side of the implement.

An output shaft 30 of the motor 12 drives the cutters 22 through a belt 36 trained around sheaves 32 and 34 rigid to shafts 30 and 24 respectively (FIG. 2). A second belt 38 trained around the double sheave 32 drives the wheels 20 through a sheave 40 rigid to a shaft 41 and a chain drive 42 (FIG. 3) between shaft 41 and axle 18. A U-shaped handlebar 44 is secured to the front extension 16a and supports a pair of control levers 46 and 48. The lever 46, through a connecting bar 50, actuates a rotatably mounted sheave 52 which tightens the belt 36 to rotate the cutters 22. The lever 48, through a connecting rod 54, actuates a rotatably mounted sheave 56 which tightens belt 38 to thereby drive the wheels 20.

Figure 4:
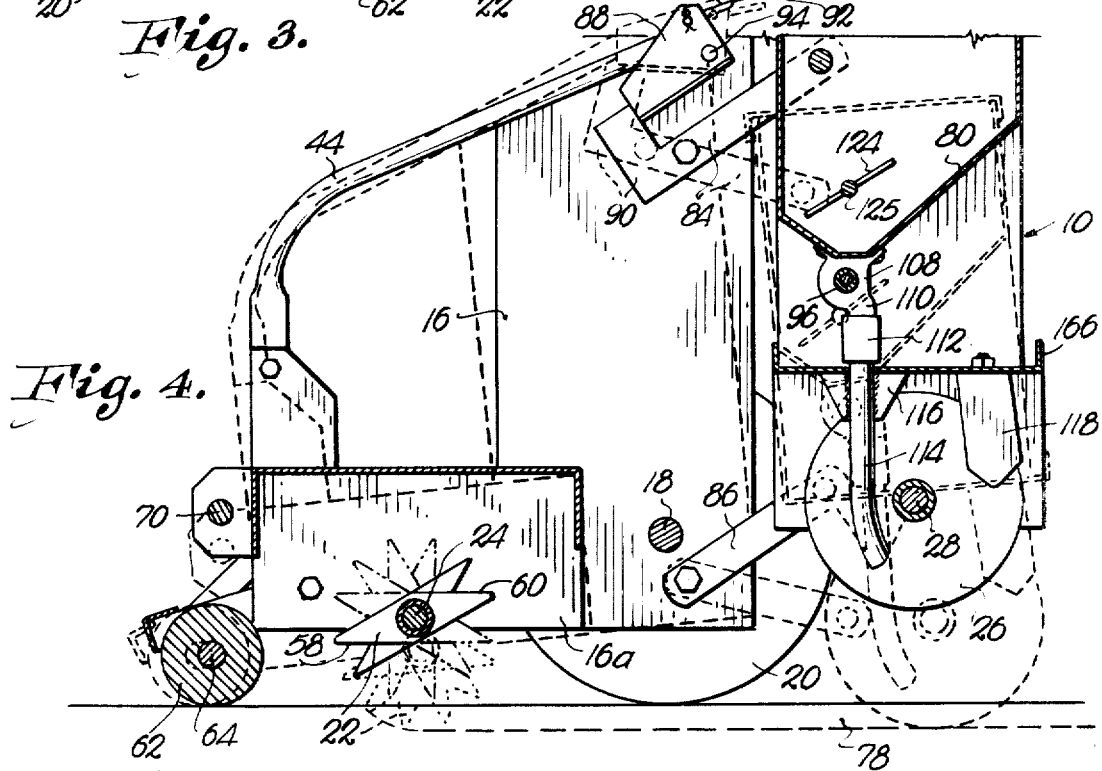
FIG. 4 is a cross-sectional view taken along line 4—4 of FIG. 3.

As best illustrated in FIG. 4, each of the cutters 22 may be trapezoidal in configuration with a pair of opposed cutting edges 58 and 60 disposed approximately 180° apart. Each of the cutters 22 is rotated relative to the next adjacent cutters 22 through a circumferential displacement sufficient to prevent simultaneous engagement of two adjacent cutting edges with the soil. In this manner, the power required to turn the shaft 24 is minimized and smooth and efficient operation of the implement is assured.

Figure 5:
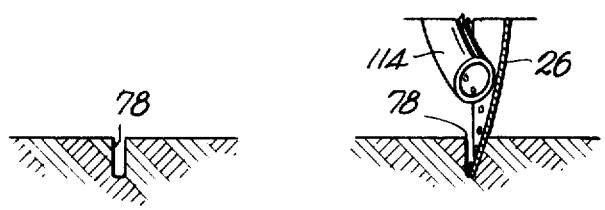
FIG. 5 is a cross-sectional view of a trench formed by one of the cutters.

An elongated, ground-engaging roller 62 extending transversely of the implement rotates about a shaft 64 which is secured to the front extension 16a of the frame 16 by a pair of pivotally mounted links 66 on opposite sides of the frame 16. Each of the links 66 has an arm 68 pivotally secured thereto, the arms 68 serving to connect the links 66 with a U-shaped connecting rod 70 which extends transversely of the implement. As illustrated in FIG. 1, one of the arms 68 and one end of the connector rod 70 are pivotally secured to a mounting bracket 72 at the end of a screw 74. The screw 74 is threadably received by a stationary bracket 76 which is secured to the forward extension 16a of the frame 16. As best shown in FIGS. 4 and 5, when the cutters 22 are in their ground-engaging positions and the shaft 24 is rotated, the cutters slash a plurality of side-by-side, parallel, spaced trenches 78 through the sod and into the soil.

Figure 6:
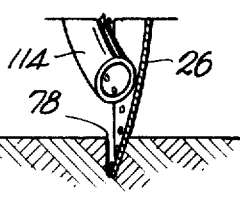
FIG. 6 is a view similar to FIG. 5 illustrating the manner in which one of the discs rides in the trench while seed is delivered thereinto.

Structure which includes a storage hopper 80 and a seed delivery mechanism 82 is supported above the bank of rotatable discs 26 and, in this particular type of machine, provides sufficient weight on the latter to cause the discs 26 to roll freely in the bottoms of the trenches 78 as illustrated in FIG. 6. The entire bank of discs 26, as well as the hopper 80 and the delivery mechanism 82, are mounted on frame 16 by a first pair of upper pivotal arms 84 located on opposite sides of the frame 16, and a second pair of lower pivotal arms 86 also swingable on the frame 16. A locking plate 88 (FIG. 4) abuts a rigid extension 90 of one of the arms 84 to prevent the latter from pivoting under the weight of the hopper 80, delivery mechanism 82, and bank of discs 26 to thereby hold the latter above the ground. An actuating rod 92 is secured to the plate 88 and extends upwardly along the handlebar 44 to permit an operator to pivot the plate 88 about a pin 94 to move the latter out of engagement with the extension 90 and thereby permit downward swinging of the arms 84 and 86.

Figure 3:
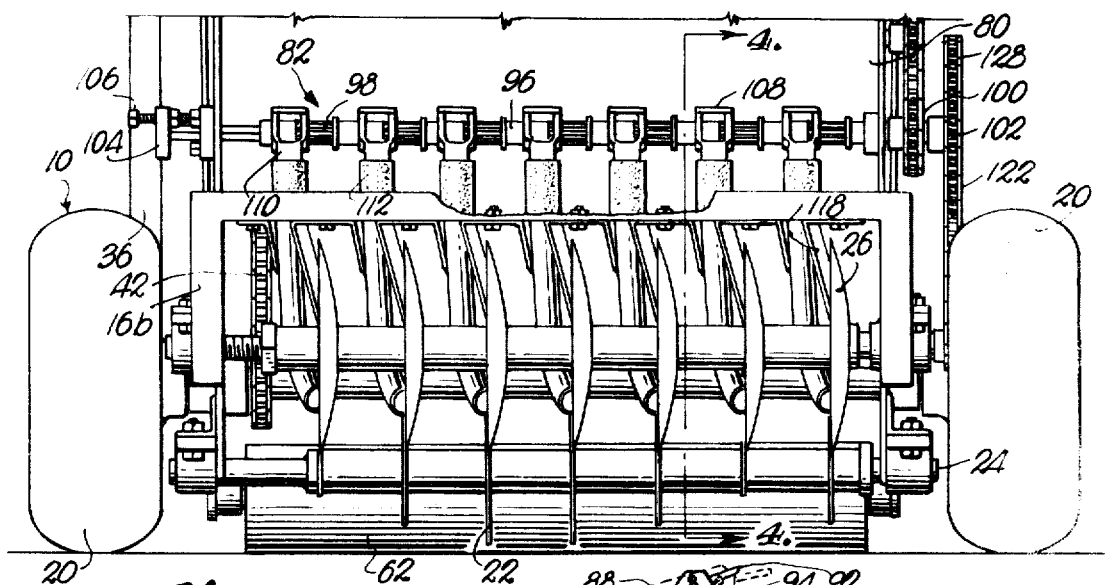
FIG. 3 is an enlarged, fragmentary, rear elevational view thereof.

Delivery mechanism 82 is positioned immediately below the lowermost end of the hopper 80, and a plurality of openings in the bottom of the hopper communicate with the delivery mechanism 82. The delivery mechanism 82 includes a rotatable shaft 96 provided with a plurality of spaced, grooved sections 98 corresponding to the number of openings in the bottom of the hopper 80. One end of the shaft 96 is provided with a pair of side-by-side sprockets 100 and 102 (FIG. 1) while the other end of the shaft is provided with an enlarged extension 104 which threadably receives a bolt 106 (FIG. 3). A plurality of shaft-encircling housings 108 are secured to the bottom of the hopper 80 in alignment with the openings therein as illustrated in FIG. 4. The shaft 96 may be moved transversely of the housings 108 by bolt 106 to adjust the extent to which the grooved sections 98 are within the housings 108 and thereby the rate of seed delivery. Each of the housings 108 has a depending leg portion 110 which telescopically receives a section of flexible conduit 112. Each of the flexible conduits 112, in turn, telescopically receives a delivery tube 114, the delivery end of which is immediately adjacent the concave face of a respective disc 26 (FIG. 6). Each of the delivery tubes 114 is secured to the rear frame extension 16b through plates 116, the tubes being welded or otherwise secured to the plates. A plurality of scrapers 118, one for each of the discs 26, may also be provided and secured to the rear frame extension 16b by bolts or other suitable means.

The drive for the delivery mechanism 82 is best illustrated in FIGS. 1 and 3. A sprocket 120 rigid with one end of the shaft 28 drives a chain 122 which is trained therearound, as well as the sprocket 102, to thereby rotate the shaft 96 from the discs 26. An agitator 124 within the hopper 80 has a sprocket 126 secured to its shaft 125, and a chain 128 interconnects the sprockets 100 and 126 to drive the agitator 124 from shaft 96.

In operation, the discs 26 are held raised by the plate 88 and the belt tighteners 52 and 56 are shifted by handles 46 and 48 respectively to their inoperative positions during starting of engine 12. As handle 48 is pulled back to the position shown in FIG. 2, belt 38 is tightened by idler 56 to cause shaft 41 to be driven by shaft 30, thereby driving axle 18 from shaft 41 through chain 42.

At the commencement of the trench-forming and seeding operation, handlebar 44 is lowered to tilt the machine about axle 18 until discs 26 engage the ground whereupon continued tilting releases the pressure of plate 88 on extension 90 so that plate 88 can be easily rotated by use of rod 92 to the dotted line position of FIG. 4. Release of the handlebar 44 then causes the discs 26, the cutters 22 and the rollers 62 to engage the ground.

When the handle 46 is then pulled back to tighten belt 36 through idler 52, shaft 24 is driven from shaft 30, causing the formation of trenches 78 as wheels 20 drive the machine forwardly. The depth of the trenches 78 is determined by roller 62 and may be adjusted by turning of screw 74.

Discs 26 follow along in the bottom of corresponding trenches 78 and as they rotate, shaft 28 drives shafts 96 and 125 through chains 122 and 128 respectively to feed seed from box 80 to tubes 114 and to operate agitator 124. Adjustment of screw 106 places a desired length of sections 98 into communication with the corresponding seed outlet of box 80, thereby determining the amount of delivered seed.

During turns or while traveling over sidewalks, driveways and other areas not to be treated, handlebar 44 is pushed down to tilt the machine about axle 18 until plate 88 catches extension 90. Then the handlebar 44 is raised enough to raise discs 26 off the ground but not enough to lower roller 62 and cutters 22 to the ground. Thus, handles 46 and 48 need not be manipulated during short periods of nonuse while traveling over areas not to be treated.

The weight of the hopper 80 filled with seed or fertilizer is sufficient to press the discs 26 downwardly into the bottoms of the trenches 78 as clearly illustrated in FIG. 6. As the vehicle 10 advances, a plurality of side-by-side, spaced, parallel trenches are slashed into the soil and through all growth that may be thereon or therein. As is clear from viewing FIG. 3, each of the rotatable discs 26 is in accurate fore-and-aft alignment with a corresponding cutter 22. The discs 26, which serve as followers in trailing relationship to the cutters 22, may, under certain conditions, operate to maintain the trenches 78 open while seed is delivered from the delivery end of tube 114 at a point proximal to each of the discs 26. Because of the loose soil produced by the cutters 22 and the natural tendency for the trenches 78 to collapse after the discs 26 have passed therethrough, the seed or fertilizer is usually covered sufficiently, but an auxiliary rake, drag or other attachment may be towed behind the discs 26 if desired to help fill the trenches 78 with dirt.

As the vehicle 10 advances and the cutters 22 slash the trenches 78 into the soil, the latter, in the form of previously sodded turf, is aerated and scarified to an extent which facilitates growth of the planted seed once the latter has germinated. Because the seed is covered within the trenches 78 and the latter readily retain moisture, germination is nearly 100 percent, and the root network of the resulting plants extends to a much greater depth than is the case if the seed is merely broadcast upon the surface. Thus, the advantages of employing the present invention are many fold. A great saving in seed or fertilizer results because of the nearly complete germination of any seed which is planted. A further saving results from the greatly reduced quantity of water which is required to effect germination of the seed supplied to the trenches 78, and the resulting stand is much more vigorous than would otherwise be the case, further reducing watering and fertilizing expenses during the normal growth period.

Rainfall or water from sprinklers will flow into the trenches 78 to aid germination and growth rather than wash the seed away or toward low spots or areas as in the case of broadcast seeding or fertilization. It has been found that better lawns, pastures and hay crops can be produced and maintained through use of machines such as above described with substantial savings in seed, fertilizers and water. Aeration, soil and turf loosening, and proper depth planting are equally important attributes of the invention.

Many of the details of construction shown and described may, however, be changed or eliminated within the scope of the present invention, depending upon the use to be made thereof. For example, the entire unit may be supported by or towed behind and powered from a tractor, especially in agricultural applications. In that event the cutters 22 might well be driven by the power take-off of the tractor, eliminating the engine 10. The power lift of the tractor could then be used to raise the implement to a transport position.

Oftentimes also, the discs 26 will serve primarily as press wheels to firmly imbed the seed into the bottom of the trenches. Thus the discs 26 might well be shaped to present opposed convex faces rather than as herein shown and above described. Moreover, in such types of machines the roller 62 might be omitted in favor of skids, shoes or wheels, and multiple prong cutters, shaped differently from the trapezoidal configuration illustrated herein, may well be quite satisfactory.

In any event, the planting of oats, corn, wheat and other seeds into bromegrass and other pasture or hay crops extends the use of my concepts well beyond lawns, gardens, parks and similar areas, rending machines or implements of this type as important in profit oriented businesses as in landscaping and recreational occupations or avocations.

Having thus described the invention, what is claimed as new and desired to be secured by Letters Patent is:

1. An aerating and planting implement capable of depositing seed in soil while displacing a minimum of sod or other mat-like ground cover thereon or therein, said implement comprising:
   a support;
   a rotor having a bank of spaced-apart, elongated, rigid trenching blades firmly affixed thereto for rotation therewith,
   said rotor being mounted on said support and rotatable about a horizontal axis disposed transversely of the normal path of travel of the implement;
   power means operably coupled with said rotor for rotating the latter as the support is advanced,
   said blades being of uniform thickness throughout their lengths and having two identical, generally triangular sections radiating in opposite directions from said axis of rotation,
   each of said sections having a pair of opposed, longitudinal cutting edges converging toward a terminal end remote from said axis,
   each blade being disposed in an upright plane with the longitudinal axis of the blade intersecting said horizontal axis of the rotor and said ends moving in a circular path of travel within said plane, whereby said blades slash through said sod or other ground cover and into the soil to form a plurality of discrete, side-by-side, spaced, parallel, rectangular trenches having generally horizontal, flat bottoms and spaced, parallel, generally upright sidewalls;
   a bank of upright, concave-convex, freely rotatable feeder discs in trailing fore-and-aft alignment with said blades disposed within said trenches in engagement with and supported by the bottoms of the trenches for maintaining the latter open as the support is advanced,
   there being a single disc for each blade respectively; and
   mechanism for discharging seed or fertilizer as the support is advanced,
   said mechanism having a strage hopper positioned above said discs and means for delivering said seed or fertilizer from said hopper for gravitational flow to the concave faces of said discs at a point below their axes of rotation, whereby said concave faces direct said seed or fertilizer to the bottoms of said trenches simultaneously with the engagement of said discs with said bottoms while the convex faces of said discs are in engagement with one of said sidewalls of their respective trenches.

* * * * *